United States Patent
Wakasa et al.

(10) Patent No.: US 10,927,785 B2
(45) Date of Patent: Feb. 23, 2021

(54) INTERNAL COMBUSTION ENGINE

(71) Applicant: HONDA MOTOR CO., LTD., Tokyo (JP)

(72) Inventors: Hidetoshi Wakasa, Wako (JP); Tetsuya Nakayasu, Wako (JP); Hiroyuki Natsui, Wako (JP); Daisuke Kitamura, Wako (JP); Yuki Nagata, Wako (JP); Kazunori Ikarashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/494,351

(22) PCT Filed: Mar. 9, 2018

(86) PCT No.: PCT/JP2018/009333
§ 371 (c)(1),
(2) Date: Sep. 16, 2019

(87) PCT Pub. No.: WO2018/180384
PCT Pub. Date: Oct. 4, 2018

(65) Prior Publication Data
US 2020/0240355 A1    Jul. 30, 2020

(30) Foreign Application Priority Data

Mar. 27, 2017  (JP) .............................. JP2017-061354

(51) Int. Cl.
*F02F 1/24* (2006.01)
*F02B 75/20* (2006.01)
(Continued)

(52) U.S. Cl.
CPC .............. *F02F 1/24* (2013.01); *F02B 75/20* (2013.01); *F02B 77/085* (2013.01); *F02F 7/0007* (2013.01); *G01M 15/08* (2013.01)

(58) Field of Classification Search
CPC . F02F 1/24; F02F 7/0007; F02B 75/20; F02B 77/085; G01M 15/08
See application file for complete search history.

(56) References Cited

U.S. PATENT DOCUMENTS 4,408,483 A  *  10/1983  Bollinger .............. G01M 15/08
                                                        73/114.16
7,308,354 B2 *  12/2007  Daneau .................. F02D 41/248
                                                          701/109
(Continued)

FOREIGN PATENT DOCUMENTS

| JP | H05-312093 | 11/1993 |
| JP | 2006-511755 | 4/2006 |
| JP | 2008-274884 | 11/2008 |

OTHER PUBLICATIONS

Marek T. Wlodarczyk, Cylinder Head Gasket With Integrated Miniature Combustion Pressure Sensors, Sep. 12, 2010, Proceedings of the ASME 2010 Internal Combustion Engine Division Fall Technical Conference (Year: 2010).*

(Continued)

*Primary Examiner* — Syed O Hasan
(74) *Attorney, Agent, or Firm* — Rankin, Hill & Clark LLP

(57) ABSTRACT

In an internal combustion engine in which a plurality of cylinders are arranged in series in a cylinder section, pressures of the cylinders can be detected by a smaller number of pressure sensors. An engine in which a plurality of cylinders are arranged in series in a cylinder section includes a communication path through which combustion chambers of the cylinders adjacent to each other communicate with each other, and a pressure sensor is disposed in the communication path.

8 Claims, 8 Drawing Sheets

(51) Int. Cl.
*F02B 77/08* (2006.01)
*F02F 7/00* (2006.01)
*G01M 15/08* (2006.01)

(56) References Cited

U.S. PATENT DOCUMENTS

2005/0126262 A1* 6/2005 Popielas ................ G01L 23/06
 73/35.12
2012/0090580 A1* 4/2012 Hu ........................ F02D 13/028
 123/564

OTHER PUBLICATIONS

International Preliminary Report on Patentability dated Oct. 10, 2019, 6 pages.
International Search Report, dated Jun. 12, 2018 (dated Jun. 12, 2018), 4 pages.

* cited by examiner

LH ←→ RH

INTERNAL COMBUSTION ENGINE

TECHNICAL FIELD

The present invention relates to an internal combustion engine.

BACKGROUND ART

Heretofore, in an internal combustion engine, a technology has been known in which a pressure sensor to detect a pressure in a cylinder section is exposed and provided in the cylinder section (e.g., see Patent Literature 1). In Patent Literature 1, a main body of the pressure sensor is disposed in a water jacket.

CITATION LIST

Patent Literature

[Patent Literature 1]
Japanese Patent Laid-Open No. 1993-312093

SUMMARY OF INVENTION

Technical Problem

In an internal combustion engine including a plurality of cylinders arranged in series in a cylinder section, it is desired that a pressure of each cylinder is detected. However, when a pressure sensor is disposed in each cylinder, the number of pressure sensors increases, and it is difficult to acquire an arrangement space of the pressure sensors.

The present invention has been developed in view of the above described situation, and an object thereof is to provide an internal combustion engine in which a plurality of cylinders are arranged in series in a cylinder section, so that pressures of the cylinders can be detected by a smaller number of pressure sensors.

Solution to Problem

All contents of Japanese Patent Application No. 2017-061354 filed on Mar. 27, 2017 are incorporated herein.

According to an aspect of the present invention, there is provided an internal combustion engine in which a plurality of cylinders (25L, 25R) are arranged in series in a cylinder section (13), the internal combustion engine including a communication path (50) through which combustion chambers (31L, 31R) of the cylinders (25L, 25R) adjacent to each other communicate with each other, wherein a pressure sensor (40) is disposed in the communication path (50).

Furthermore, the above aspect of the invention may have a configuration where check valves (55L, 55R) are arranged in the communication path (50).

Additionally, the above aspect of the invention may have a configuration where the check valves include a one-side check valve (55L) disposed on a side of one of the cylinders (25L), and an other-side check valve (55R) disposed on a side of the other of the cylinders (25R), the pressure sensor (40) is disposed between the one-side check valve (55L) and the other-side check valve (55R), the one-side check valve (55L) allows flow of a pressure from the one of the cylinders (25L) to the other of the cylinders (25R), and the other-side check valve (55R) allows flow of a pressure from the other of the cylinders (25R) to the one of the cylinders (25L).

In addition, the above aspect of the invention may have a configuration where a wall portion (18e) that partitions the adjacent combustion chambers (31L, 31R) is disposed between the adjacent combustion chambers (31L, 31R), and the pressure sensor (40) is inserted in the wall portion (18e).

Furthermore, the above aspect of the invention may have a configuration where the cylinder section (13) includes a cylinder head (18) including the combustion chambers (31L, 31R), and a cylinder head cover (19), the communication path (50) is provided in the cylinder head (18), and the pressure sensor (40) is inserted from a side of the cylinder head cover (19) to the wall portion (18e).

Additionally, the above aspect of the invention may have a configuration where the cylinder section (13) includes a cylinder block (17), and a cylinder head (18) including the combustion chambers (31L, 31R), the cylinder head (18) includes a bonding surface (18b) that abuts and bonds onto the cylinder block (17), and the communication path (50) is a groove (51) formed in the bonding surface (18b).

Advantageous Effects of Invention

An internal combustion engine of an aspect of the present invention in which a plurality of cylinders are arranged in series in a cylinder section includes a communication path through which combustion chambers of the cylinders adjacent to each other communicate with each other, and a pressure sensor is disposed in the communication path. Consequently, respective pressures of the combustion chambers of the adjacent cylinders can be detected by the pressure sensor disposed in the communication path. In consequence, the pressures of the cylinders can be detected by a smaller number of pressure sensors.

Furthermore, in the above aspect of the invention, check valves may be arranged in the communication path. According to this configuration, flow of a gas between the adjacent cylinders is controlled with the check valve, and the pressure of each cylinder can be properly detected.

Additionally, the above aspect of the invention may have a configuration where the check valves include a one-side check valve disposed on a side of one cylinder, and an other-side check valve disposed on a side of the other cylinder, the pressure sensor is disposed between the one-side check valve and the other-side check valve, the one-side check valve allows flow of a pressure from the one cylinder to the other cylinder, and the other-side check valve allows flow of a pressure from the other cylinder to the one cylinder. According to this configuration, the pressure can be inhibited from leaking to the adjacent cylinder, and the pressure of the cylinder can be properly detected by the pressure sensor. A state in the adjacent cylinder can be adjusted to be satisfactory.

Furthermore, in the above aspect of the invention, a wall portion that partitions the adjacent combustion chambers may be disposed between the adjacent combustion chambers, and the pressure sensor may be inserted in the wall portion. According to this configuration, the pressure sensor can be supported with a simple structure by use of the wall portion that partitions the adjacent combustion chambers.

Additionally, in the above aspect of the invention, the cylinder section may include a cylinder head including the combustion chambers, and a cylinder head cover, the communication path may be provided in the cylinder head, and the pressure sensor may be inserted from a side of the cylinder head cover to the wall portion. According to this configuration, the pressure sensor can be easily inserted from the cylinder head cover side to the wall portion.

In addition, the above aspect of the invention may have a configuration where the cylinder section includes a cylinder block, and a cylinder head including the combustion chambers, the cylinder head includes a bonding surface that abuts and bonds onto the cylinder block, and the communication path is a groove formed in the bonding surface. According to this configuration, the communication path can be easily formed in a vicinity of the combustion chamber.

DESCRIPTION OF EMBODIMENT

Figure 1:
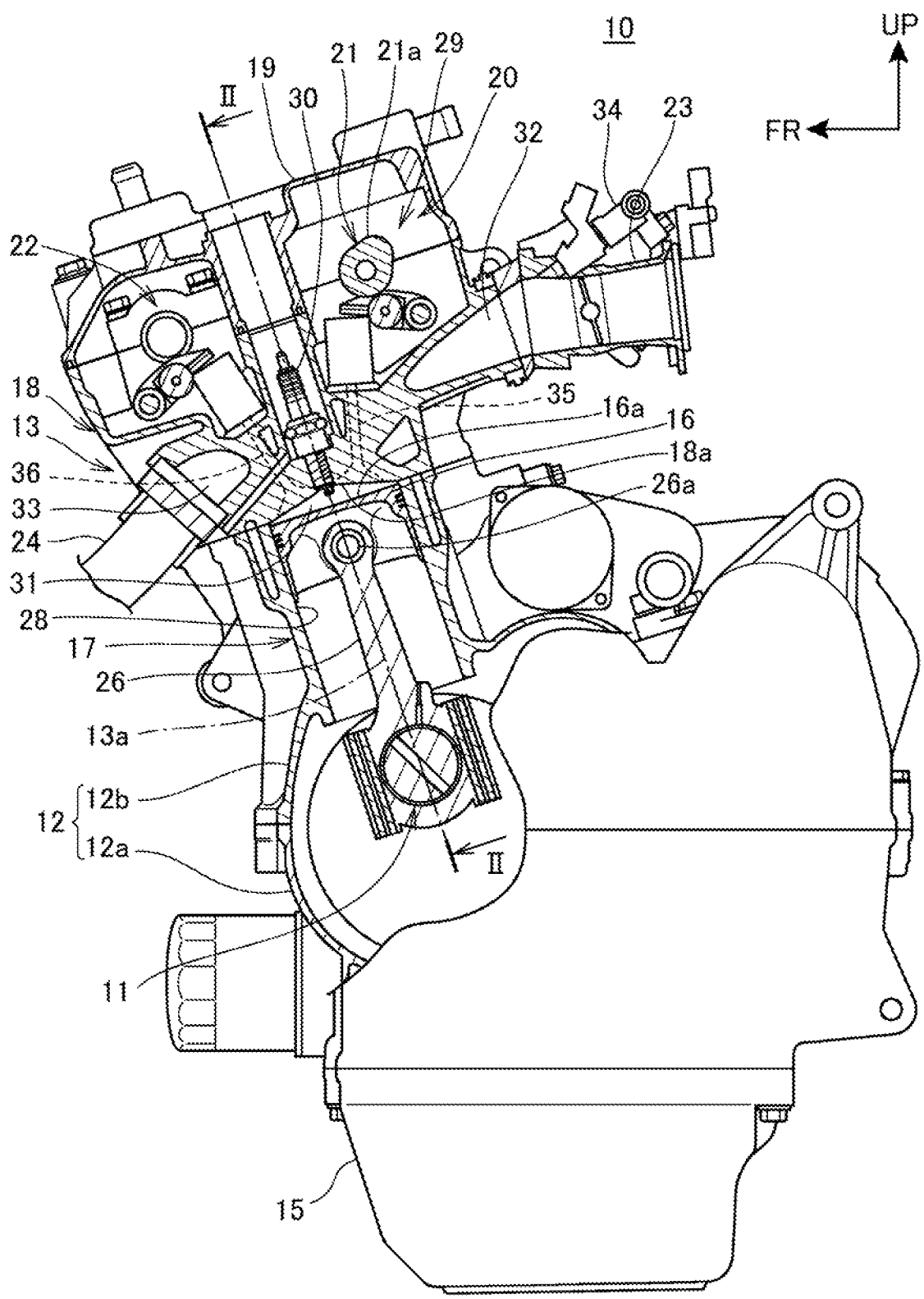
FIG. 1 is a cross-sectional view of an engine according to an embodiment of the present invention seen in an axial direction of a crank shaft.

Hereinafter, an embodiment of the present invention will be described with reference to the drawings. Note that in the description, front, rear, right, left, upward and downward directions are the same as in directions to a vehicle in which an engine 10 is mounted unless otherwise stated. Furthermore, reference sign FR shown in the respective drawings indicates a front of the vehicle, reference sign UP indicates an upward direction of the vehicle, and reference sign LH indicates a left of the vehicle. Furthermore, in the drawings, a right of the vehicle is denoted with reference sign RH.

Figure 2:
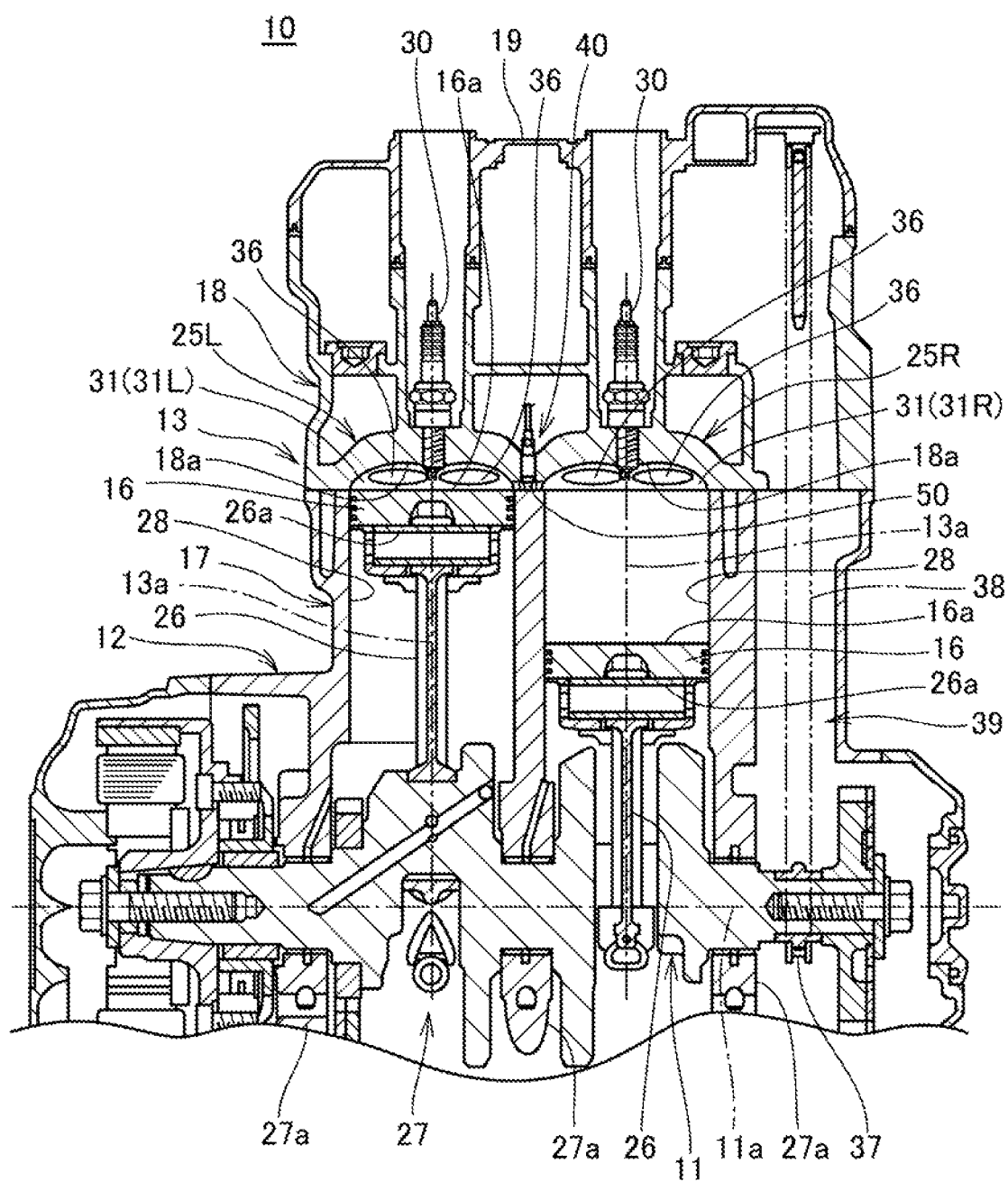
FIG. 2 is a cross-sectional view taken along the II-II line of FIG. 1.

FIG. 1 is a cross-sectional view of the engine 10 according to the embodiment of the present invention seen in an axial direction of a crank shaft 11. FIG. 2 is a cross-sectional view taken along the II-II line of FIG. 1.

The engine 10 (an internal combustion engine) is mounted in a saddle riding-type vehicle such as a motorcycle. The engine 10 is a multiple-cylinder 4-cycle engine in which a plurality of cylinders 25L and 25R are arranged in series. Specifically, the engine 10 is a water-cooled in-line 2-cylinder engine.

The engine 10 is disposed between a front wheel and a rear wheel of the motorcycle (not shown), and is supported by a vehicle body frame.

The engine 10 includes a crank case 12 that accommodates the crank shaft 11 extending in a vehicle width direction (a right-left direction), and a cylinder section 13 bonded to the crank case 12. The cylinder section 13 extends upward from a front portion of the crank case 12 to an upper front part of the motorcycle. A cylinder axis 13a of the cylinder section 13 is inclined forward relative to a vertical direction.

A transmission (not shown) that decelerates a driving power of the engine 10 and transmits the power to a rear wheel side is built in a rear portion of the crank case 12. An oil pan 15 is attached to a lower portion of the crank case 12.

The crank case 12 is formed by bonding a lower case 12a and an upper case 12b of two cases divided in an up-down direction. The oil pan 15 is attached to a lower surface of the lower case 12a.

The cylinder section 13 includes a cylinder block portion 17 (a cylinder block) in which a piston 16 is accommodated, a cylinder head 18 bonded to an upper surface of the cylinder block portion 17, and a cylinder head cover 19 attached to an upper surface of the cylinder head 18.

The cylinder block portion 17 is formed integrally with an upper portion of the upper case 12b of the crank case 12.

In a valve chamber 20 formed between the cylinder head 18 and the cylinder head cover 19, an intake cam shaft 21 and an exhaust cam shaft 22 arranged in parallel with the crank shaft 11 are accommodated. The intake cam shaft 21 and the exhaust cam shaft 22 are supported on an upper surface portion of the cylinder head 18, and rotate in conjunction with the crank shaft 11.

The cylinder section 13 includes two cylinders 25L and 25R arranged along an axis 11a of the crank shaft 11, and the pistons 16 are provided in the cylinders 25L and 25R, respectively. The cylinders 25L and 25R have a similar configuration, and are arranged adjacent to each other. In each of the cylinders 25L and 25R, an intake device 23 is attached to a rear surface portion of the cylinder head 18, and an exhaust tube 24 is attached to a front surface portion of the cylinder head 18.

The piston 16 is coupled to the crank shaft 11 via a connecting rod 26. The piston 16 is coupled to a tip portion of the connecting rod 26 via a piston pin 26a provided in parallel with the crank shaft 11.

The crank shaft 11 is rotatably supported on a plurality of support walls 27a provided in a crank chamber 27 of the crank case 12.

Each of the cylinders 25L and 25R includes a cylinder bore 28 that is formed in the cylinder block portion 17 to accommodate the piston 16, a valve device 29 provided in the cylinder head 18, and an ignition plug 30 attached to the cylinder head 18.

An axis of the cylinder bore 28 formed in a cylindrical shape is the cylinder axis 13a of the cylinder section 13.

In the following description, along the cylinder axis 13a, a crank shaft 11 side will be referred to as a downward direction of the cylinder section 13, and a cylinder head cover 19 side will be referred to an upward direction of the cylinder section 13.

The cylinder head 18 includes a combustion concave portion 18a that faces a top surface 16a of the piston 16. The combustion concave portion 18a is a concave portion of a lower surface of the cylinder head 18 dented on the cylinder head cover 19 side, and closes an upper surface opening of the cylinder bore 28. A combustion chamber 31 is formed between the top surface 16a and the combustion concave portion 18a.

The cylinder head 18 includes an intake port 32 through which the intake device 23 communicates with the combustion chamber 31 via an opening (not shown) of a lower end of the port, and an exhaust port 33 through which the combustion chamber 31 communicates with the exhaust tube 24 via an opening 33a (FIG. 3) of a lower end of the port.

Fuel is injected into the intake port 32 by a fuel supply device 34.

The valve device 29 includes the intake cam shaft 21 and the exhaust cam shaft 22 described above, an intake valve 35 that opens and closes the opening of the intake port 32, an exhaust valve 36 that opens and closes the opening 33a (FIG. 3) of the exhaust port 33, a valve spring (not shown) that urges the intake valve 35 in a valve closing direction, and a valve spring (not shown) that urges the exhaust valve 36 in the valve closing direction.

A pair of intake valves 35 are provided side by side in the axial direction of the crank shaft 11 in each of the cylinders 25L and 25R. A pair of exhaust valves 36 are provided side by side in the axial direction of the crank shaft 11 in each of the cylinders 25L and 25R. That is, in each of the cylinders 25L and 25R, four valves 35 and 36 are arranged.

The intake valve 35 is pressed by an intake cam 21a provided in the intake cam shaft 21 and is thus driven, to open the above opening of the intake port 32 at a predetermined timing. The exhaust valve 36 is pressed by an exhaust cam (not shown) provided in the exhaust cam shaft 22 and is thus driven, to open the opening 33a (FIG. 3) of the exhaust port 33 at a predetermined timing.

The crank shaft 11 includes a drive sprocket 37 in a shaft end portion that projects outward from the crank chamber 27. A driving power of the crank shaft 11 is transmitted to the valve device 29 by a driving power transmission member 38 that connects the drive sprocket 37 to the intake cam shaft 21 and the exhaust cam shaft 22.

The engine 10 includes a power transmission member storage chamber 39 outside the right cylinder 25R. The driving power transmission member 38 is stored in the power transmission member storage chamber 39. The driving power transmission member 38 is, for example, a chain.

The piston 16 reciprocates and moves in the cylinder bore 28, when a mixed gas supplied from the intake port 32 to the combustion chamber 31 is ignited by the ignition plug 30 and combusted.

The engine 10 is the 4-cycle engine. Every time the crank shaft 11 rotates as much as 180°, there are started an intake step of lowering the piston 16 to take in air, a compression step of raising the piston 16 up to a top dead center to compress the mixed gas, a combustion step of lowering the piston 16 down to a bottom dead center due to expansion of the combustion gas ignited by the ignition plug 30, and an exhaust step of raising the piston 16 to exhaust the gas.

Specifically, the engine 10 is an engine in which the timing of the ignition by the ignition plug 30 differs between the one cylinder 25L and the other cylinder 25R. Examples of this difference in timing include 180°, 270° C. and 360° in a rotation phase of the crank shaft 11, but in the present embodiment, the difference in timing is 270°.

Consequently, in the engine 10, when the piston 16 is at the top dead center of the compression step in the one cylinder 25L as shown in FIG. 2, the piston 16 is in a state of the intake step in the other cylinder 25R.

Further in the engine 10, a pressure sensor 40 that detects a pressure in the cylinder section 13 is provided.

Figure 3:
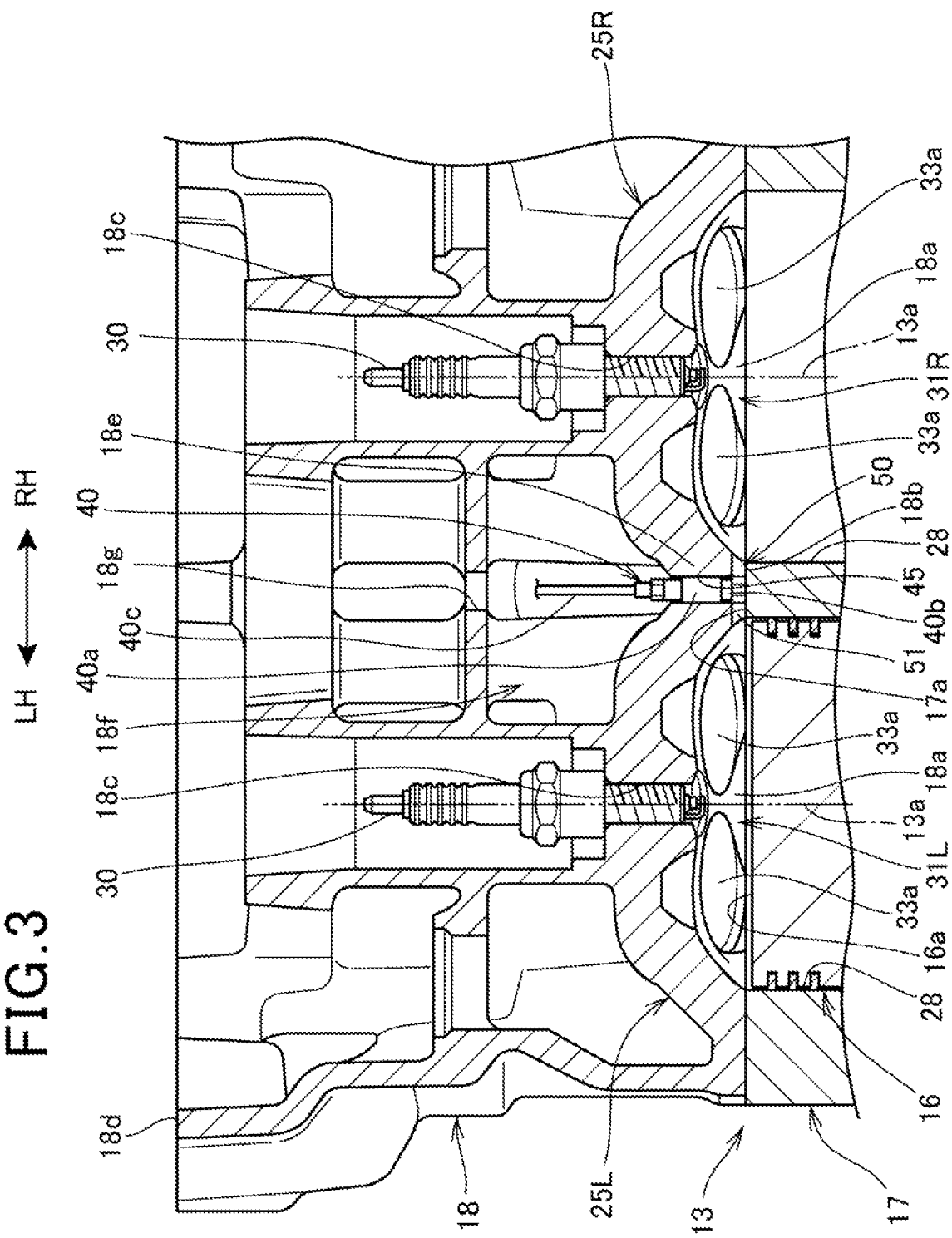
FIG. 3 is an enlarged cross-sectional view of a peripheral part of a combustion chamber in FIG. 2.
Figure 4:
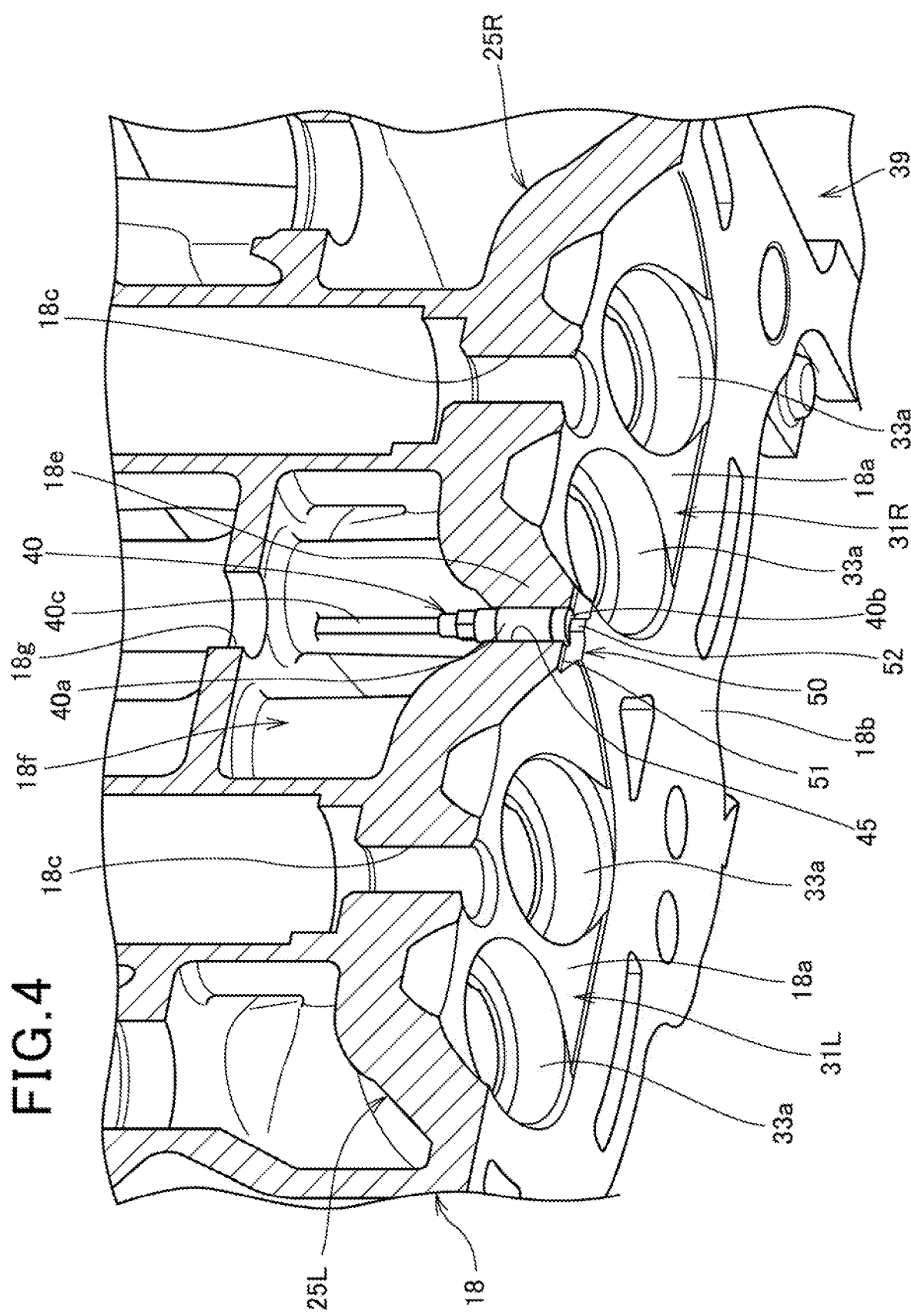
FIG. 4 is a perspective view of a cylinder head shown in the cross-sectional view of FIG. 3 and seen from a side of a cylinder block portion.

FIG. 3 is an enlarged cross-sectional view of a peripheral part of the combustion chamber 31 in FIG. 2. FIG. 4 is a perspective view of the cylinder head 18 shown in the cross-sectional view of FIG. 3 and seen from a cylinder block portion 17 side. Note that FIG. 3 and FIG. 4 do not show the intake valve 35 and the exhaust valve 36, and a one-side check valve 55L and an other-side check valve 55R which will be described later. In FIG. 4, the ignition plug 30 is not shown.

The pressure sensor 40 includes a columnar main body portion 40a, a detecting portion 40b provided in a tip portion of the sensor, and a wire portion 40c drawn from a base end of the main body portion 40a. A diameter of the detecting portion 40b is smaller than a diameter of the main body portion 40a.

The pressure sensor 40 is, for example, a piezoelectric sensor. The pressure detected by the detecting portion 40b is converted to an electric signal by a circuit portion of the main body portion 40a, and the signal is output to a control unit of the engine 10 or the vehicle via the wire portion 40c.

The lower surface of the cylinder head 18 abuts on an upper surface 17a of the cylinder block portion 17 to constitute a bonding surface 18b bonded to the upper surface 17a.

The cylinder head 18 and the cylinder block portion 17 are bonded with a plurality of bolts (not shown) oriented in parallel with the cylinder axis 13a and provided around the cylinder bore 28.

The ignition plug 30 is inserted and supported in a plug support hole 18c formed in the combustion concave portion 18a of the cylinder head 18. The plug support hole 18c is provided on the cylinder axis 13a.

The upper surface of the cylinder head 18 constitutes a head cover bonding surface 18d to which the cylinder head cover 19 is bonded.

In the following description, the combustion chamber 31 is divided into a combustion chamber 31L of the one cylinder 25L and a combustion chamber 31R of the other cylinder 25R for explanation.

In the cylinder section 13, there is formed a communication path 50 through which the combustion chamber 31L communicates with the combustion chamber 31R.

The cylinder head 18 includes a wall portion 18e that partitions the combustion chamber into the combustion chamber 31L and the combustion chamber 31R, between the combustion chamber 31L and the combustion chamber 31R. The communication path 50 is formed in the wall portion 18e.

Specifically, the communication path 50 is a hole portion divided by a groove 51 formed in the bonding surface 18b in the wall portion 18e of the cylinder head 18 and the upper surface 17a of the cylinder block portion 17. The groove 51 linearly extends. Both ends of the groove 51 open in the combustion chamber 31L and the combustion chamber 31R, respectively.

The groove 51 is formed, for example, by a method of integrally forming the groove during casting of the cylinder head 18, or a method of cutting the groove by machining after the cylinder head 18 is casted. In the present embodiment, the groove 51 is formed in an end surface of the cylinder head 18 and opened outward, and hence, the groove 51 can be easily formed by the casting or machining.

Figure 5:
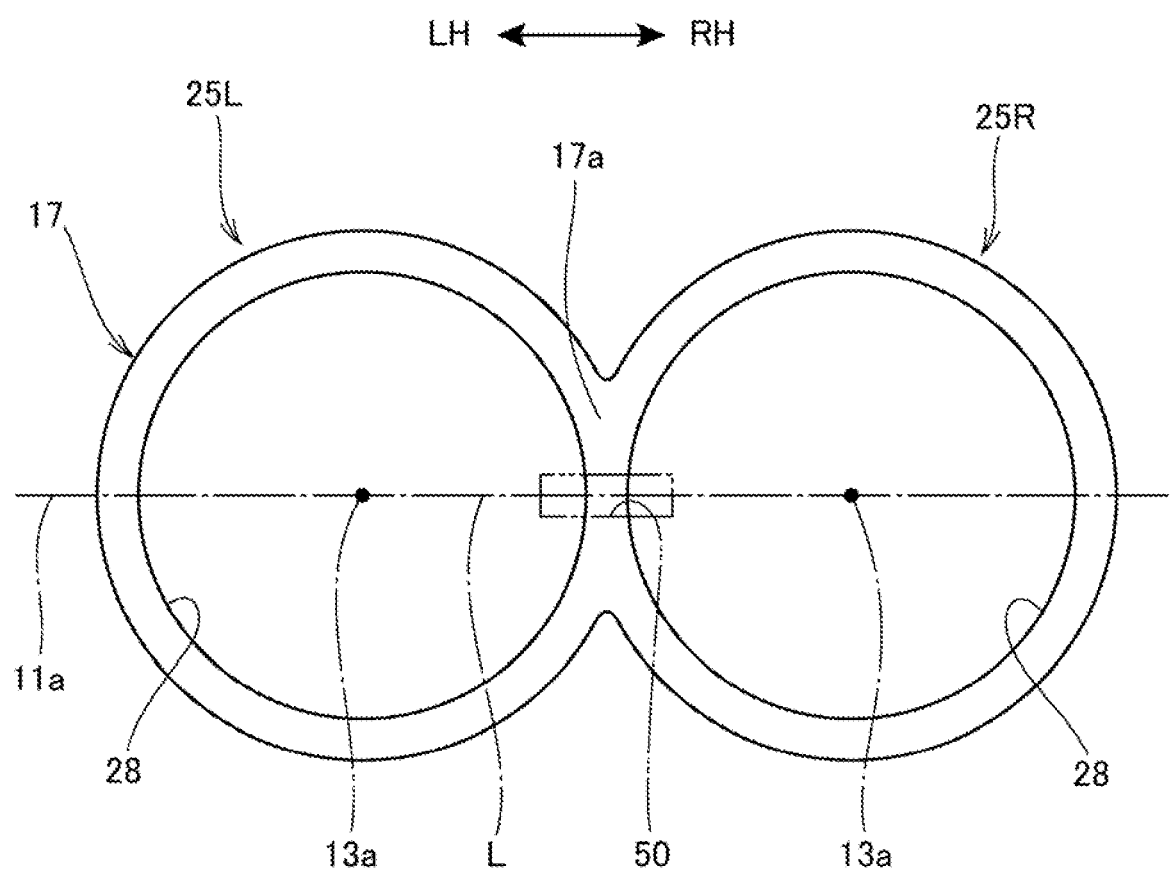
FIG. 5 is a view showing a position of a communication path in a state where a cylinder bore is seen in an axial direction of a cylinder axis.

FIG. 5 is a view showing a position of the communication path 50 in a state where the cylinder bores 28 and 28 are seen in the axial direction of the cylinder axis 13a.

The communication path 50 extends along the axis 11a of the crank shaft 11 in an arrangement direction of the cylinder bores 28 and 28, and communicates with the combustion chamber 31L and the combustion chamber 31R.

Specifically, the communication path 50 is provided on a virtual straight line L that connects the cylinder axis 13a of the one cylinder 25L to the cylinder axis 13a of the other cylinder 25R in axial view of the cylinder axis 13a. Consequently, the combustion chamber 31L communicates with the combustion chamber 31R through the short communication path 50.

The straight line L substantially coincides with the axis 11a of the crank shaft 11 in the axial view of the cylinder axis 13a.

Figure 6:
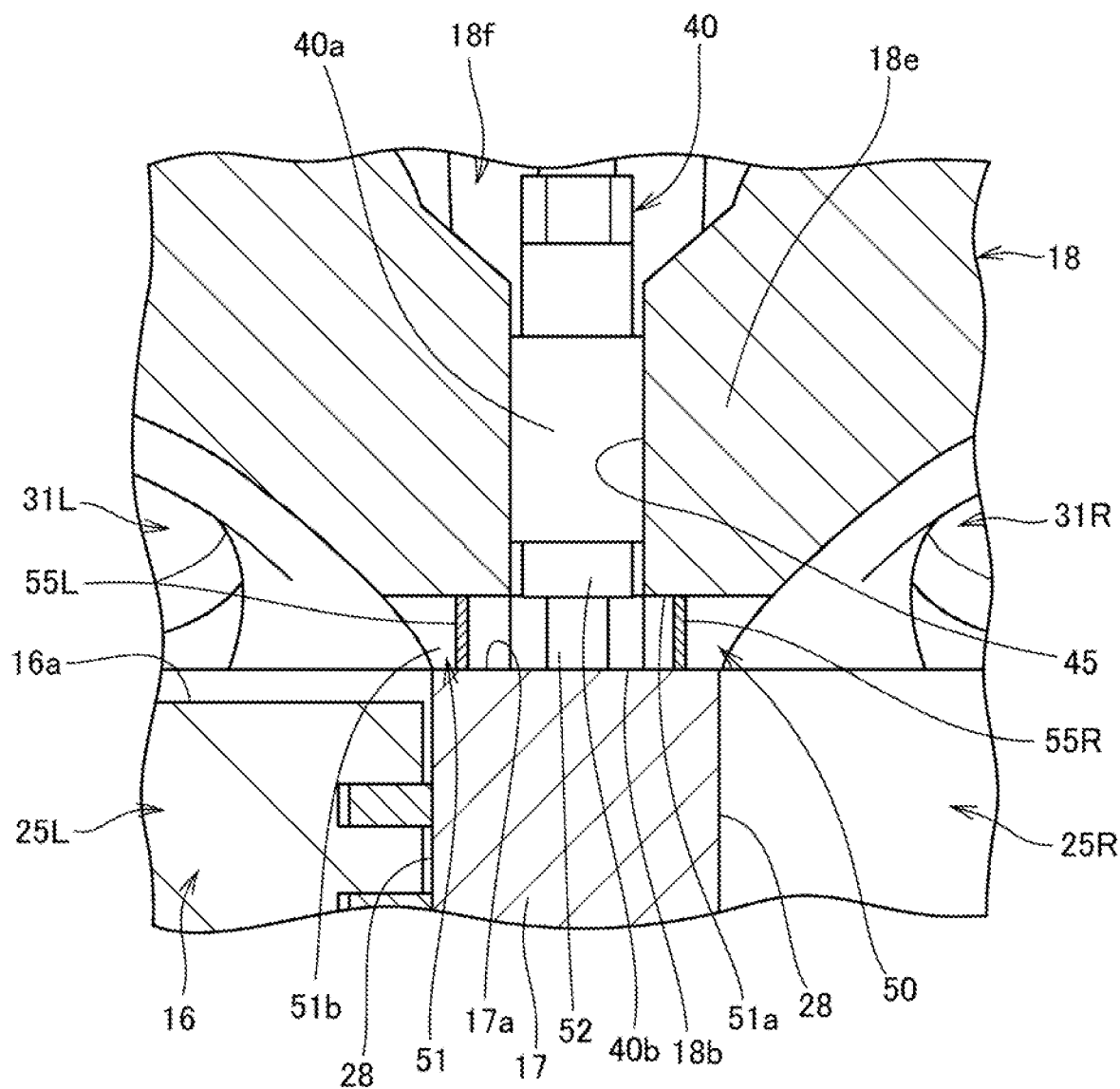
FIG. 6 is an enlarged cross-sectional view of a peripheral part of a pressure sensor in FIG. 3.

FIG. 6 is an enlarged cross-sectional view of a peripheral part of the pressure sensor 40 in FIG. 3.

Referring to FIG. 3, FIG. 4 and FIG. 6, a sensor support hole 45 is formed to communicate with the communication path 50 in the wall portion 18e of the cylinder head 18.

The sensor support hole 45 extends through a bottom surface 51a of the groove 51 from the cylinder head cover 19 side. Specifically, a water jacket 18f through which cooling water of the engine 10 flows is formed between the wall portion 18e and the head cover bonding surface 18d in the cylinder head 18. Through the sensor support hole 45, the water jacket 18f communicates with the communication path 50.

The sensor support hole 45 is provided in parallel with the plug support hole 18c and the cylinder axis 13a. Consequently, when the plug support hole 18c and the sensor support hole 45 are finished by the machining or the like, the plug support hole 18c and the sensor support hole 45 can be processed from the same direction, and the sensor support hole 45 can be easily processed.

The pressure sensor 40 is inserted in the sensor support hole 45 from a water jacket 18f side and fixed to the sensor support hole 45. The detecting portion 40b of the pressure sensor 40 is exposed in the communication path 50. The pressure sensor 40 is disposed at an intermediate location between the combustion chamber 31L and the combustion chamber 31R on the communication path 50.

The pressure sensor 40 is fixed to the sensor support hole 45 so that the communication path 50 can be sealed. The pressure sensor 40 is fixed to the sensor support hole 45, for example, by a threaded portion provided in an outer periphery of the pressure sensor 40, but there are not any special restrictions on this fixing method.

Furthermore, the cylinder head 18 includes, in a wall that divides the water jacket 18f, a sensor through hole 18g through which the pressure sensor 40 is inserted in the sensor support hole 45 from a head cover bonding surface 18d side. The sensor through hole 18g is closed with a plug member (not shown), after the pressure sensor 40 is fixed to the sensor support hole 45.

The communication path 50 includes a projecting portion 52 that projects from a side surface 51b of the groove 51 into the communication path 50. An amount of the projecting portion 52 to be projected is set to such a size that the communication path 50 is not closed. An upper surface of the projecting portion 52 is a flat surface, and the detecting portion 40b at a tip of the pressure sensor 40 abuts on this flat surface and is positioned.

In the communication path 50, the one-side check valve 55L and the other-side check valve 55R are provided to regulate pressure flow based on a difference in pressure in the communication path 50.

The one-side check valve 55L is disposed on a combustion chamber 31L side in the communication path 50, and the other-side check valve 55R is disposed on a combustion chamber 31R side in the communication path 50.

Specifically, the one-side check valve 55L is disposed between the combustion chamber 31L and the pressure sensor 40 in the communication path 50, and the other-side check valve 55R is disposed between the combustion chamber 31R and the pressure sensor 40 in the communication path 50.

The one-side check valve 55L allows flow of a gas from the combustion chamber 31L side to the combustion chamber 31R side, and regulates flow of a gas from the combustion chamber 31R side to the combustion chamber 31L side.

The other-side check valve 55R allows the flow of the gas from the combustion chamber 31R side to the combustion chamber 31L side, and regulates the flow of the gas from the combustion chamber 31L side to the combustion chamber 31R side.

Figure 7:
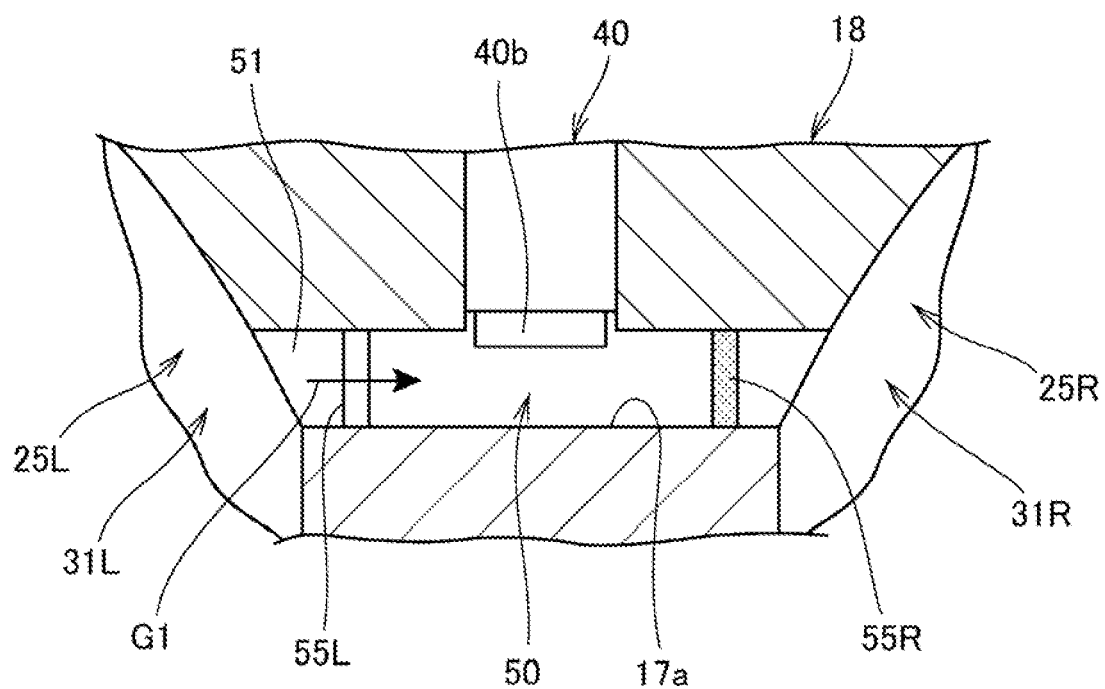
FIG. 7 is a view showing flow of a gas when a pressure of a combustion chamber of one cylinder is detected.
Figure 8:
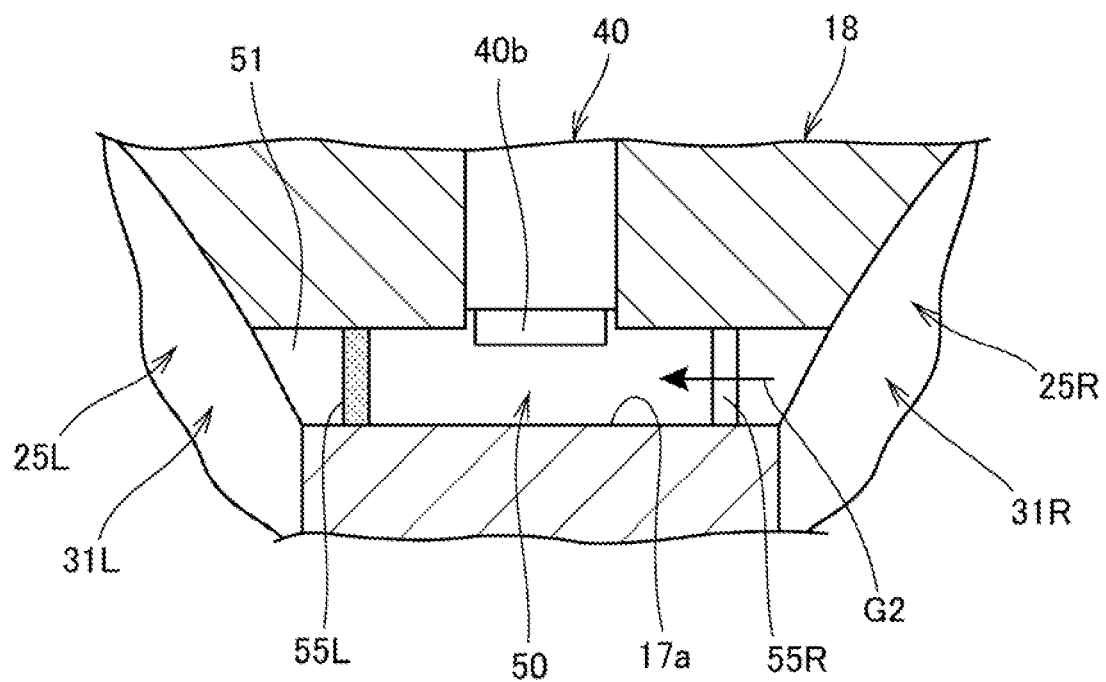
FIG. 8 is a view showing flow of a gas when a pressure of a combustion chamber of the other cylinder is detected.

FIG. 7 is a view showing the flow of the gas when the pressure of the combustion chamber 31L is detected. FIG. 8 is a view showing the flow of the gas when the pressure of the combustion chamber 31R is detected.

Referring to FIG. 2, when the one cylinder 25L is at the top dead center of the compression step, the pressure in the one cylinder 25L is larger than the pressure in the other cylinder 25R, and a gas G1 of the combustion chamber 31L is to flow through the communication path 50 toward the combustion chamber 31R. In this case, as shown in FIG. 7, the gas G1 of the combustion chamber 31L flows through the one-side check valve 55L to the detecting portion 40b of the pressure sensor 40, and the flow of the gas to the combustion chamber 31R is regulated by the other-side check valve 55R.

Consequently, the pressure of the combustion chamber 31L can be inhibited from leaking to the combustion chamber 31R, and the pressure of the combustion chamber 31L can be properly detected by the pressure sensor 40. The gas of the combustion chamber 31L can be inhibited from influencing a state in the combustion chamber 31R.

Furthermore, a phase of the crank shaft 11 changes from FIG. 2, and the other cylinder 25R is at the top dead center of the compression step. In this state, the pressure in the other cylinder 25R is larger than the pressure in the one cylinder 25L, and a gas G2 of the combustion chamber 31R is to flow through the communication path 50 toward the combustion chamber 31L.

In this case, as shown in FIG. 8, the gas G2 of the combustion chamber 31R flows through the other-side check valve 55R to the detecting portion 40b of the pressure sensor 40, and the flow to the combustion chamber 31L is regulated by the one-side check valve 55L.

Consequently, the pressure of the combustion chamber 31R can be inhibited from leaking to the combustion chamber 31L, and the pressure of the combustion chamber 31R can be properly detected by the pressure sensor 40. The gas of the combustion chamber 31R can be inhibited from influencing a state in the combustion chamber 31L.

Additionally, in the engine 10, a cycle in which the pressures of the combustion chamber 31L and the combustion chamber 31R alternately rise is repeated. Consequently, the pressure at the top dead center of the compression step is not limited. Also when the engine 10 is in the other step, changes of the pressures of the combustion chamber 31L and the combustion chamber 31R can be detected at any time by one pressure sensor 40.

As described above, according to the embodiment to which the present invention is applied, the engine 10 in which the plurality of cylinders 25L and 25R are arranged in series in the cylinder section 13 includes the communication path 50 through which the combustion chambers 31L and 31R of the cylinders 25L and 25R adjacent to each other communicate with each other, and the pressure sensor 40 is disposed in the communication path 50. Consequently, the respective pressures of the combustion chambers 31L and 31R of the adjacent cylinders 25L and 25R can be detected by the pressure sensor 40 disposed in the communication path 50. In consequence, the pressures of the cylinders 25L and 25R can be detected by a smaller number of pressure sensors 40.

Furthermore, the one-side check valve 55L and the other-side check valve 55R are arranged in the communication path 50. Consequently, the flow of the gas between the adjacent cylinders 25L and 25R is controlled with the one-side check valve 55L and the other-side check valve 55R, so that the pressures of the cylinders 25L and 25R can be properly detected.

Additionally, the check valves include the one-side check valve 55L disposed on the one cylinder 25L side, and the other-side check valve 55R disposed on the other cylinder 25R side, the pressure sensor 40 is disposed between the one-side check valve 55L and the other-side check valve 55R, the one-side check valve 55L allows the flow of the pressure from the one cylinder 25L to the other cylinder 25R, and the other-side check valve 55R allows the flow of the pressure from the other cylinder 25R to the one cylinder 25L. Consequently, the pressure of the one cylinder 25L can be inhibited from leaking to the other cylinder 25R, and the pressure of the one cylinder 25L can be properly detected by the pressure sensor 40. The gas of the one cylinder 25L can be inhibited from influencing the state in the other cylinder 25R. Furthermore, the pressure of the other cylinder 25R can be inhibited from leaking to the one cylinder 25L, and the pressure of the other cylinder 25R can be properly detected by the pressure sensor 40. The gas of the other cylinder 25R can be inhibited from influencing the state in the one cylinder 25L.

Furthermore, the wall portion 18e that partitions the adjacent combustion chambers 31L and 31R is provided between the adjacent combustion chambers 31L and 31R, and the pressure sensor 40 is inserted in the wall portion 18e. Consequently, the pressure sensor 40 can be supported with the simple structure by use of the wall portion 18e that partitions the adjacent combustion chambers 31L and 31R.

Additionally, the cylinder section 13 includes the cylinder head 18 including the combustion chambers 31L and 31R, and the cylinder head cover 19, the communication path 50 is provided in the cylinder head 18, and the pressure sensor 40 is inserted from the cylinder head cover 19 side to the wall portion 18e. Consequently, the pressure sensor 40 can be easily inserted from the cylinder head cover 19 side to the wall portion 18e.

In addition, the cylinder section 13 includes the cylinder block portion 17, and the cylinder head 18 including the combustion chambers 31L and 31R, the cylinder head 18 includes the bonding surface 18b that abuts and bonds onto the cylinder block portion 17, and the communication path 50 is the groove 51 formed in the bonding surface 18b. Consequently, the groove 51 can be easily formed, and the communication path 50 can be easily provided in the vicinity of the combustion chambers 31L and 31R.

Note that the above embodiment shows an aspect to which the present invention is applied, and the present invention is not limited to the above embodiment.

In the above embodiment, it is described that in the communication path 50, the one-side check valve 55L and the other-side check valve 55R are arranged. However, the one-side check valve 55L and the other-side check valve 55R may not be provided, and also in this case, the pressures of the one cylinder 25L and the other cylinder 25R in which the pressures alternately rise can be detected by one pressure sensor 40.

Furthermore, in the above embodiment, the 2-cylinder engine 10 is described as an example, but the embodiment is not limited to this example. The present invention is also applicable to an engine in which three or more cylinders are arranged adjacent to each other in series.

Additionally, the present invention may be applied to an engine in which the ignition is performed at the same timing in the one cylinder 25L and the other cylinder 25R by the ignition plug 30.

In addition, the motorcycle is described as an example in the above embodiment, but the present invention is not limited to this example. The present invention is applicable to a three-wheel saddle riding-type vehicle including two front or rear wheels, a saddle riding-type vehicle including four or more wheels, or a saddle riding-type vehicle such as a scooter.

REFERENCE SIGNS LIST 10 engine (internal combustion engine)
13 cylinder section
17 cylinder block portion (cylinder block)
18 cylinder head
18b bonding surface
18e wall portion
19 cylinder head cover
25L cylinder (one cylinder)
25R cylinder (the other cylinder)
31L and 31R combustion chamber
40 pressure sensor
50 communication path
51 groove
55L one-side check valve (check valve)
55R other-side check valve (check valve)

The invention claimed is:

1. An internal combustion engine in which a plurality of cylinders are arranged in series in a cylinder section, the internal combustion engine comprising:
    a communication path through which combustion chambers of the cylinders adjacent to each other communicate with each other, wherein
    a pressure sensor is disposed in the communication path,
    check valves are arranged in the communication path,
    the check valves comprise a one-side check valve disposed on a side of one of the cylinders, and an other-side check valve disposed on a side of the other of the cylinders,
    the pressure sensor is disposed between the one-side check valve and the other-side check valve, and
    the one-side check valve allows flow of a pressure from the one of the cylinders to the other of the cylinders, and the other-side check valve allows flow of a pressure from the other of the cylinders to the one of the cylinders.

2. The internal combustion engine according to claim 1, wherein a wall portion that partitions the adjacent combustion chambers is disposed between the adjacent combustion chambers, and the pressure sensor is inserted in the wall portion.

3. The internal combustion engine according to claim 2, wherein the cylinder section comprises a cylinder head comprising the combustion chambers, and a cylinder head cover,
    the communication path is provided in the cylinder head, and the pressure sensor is inserted from a side of the cylinder head cover to the wall portion.

4. The internal combustion engine according to claim 1, wherein
    the cylinder section comprises a cylinder block, and a cylinder head comprising the combustion chambers,
    the cylinder head comprises a bonding surface that abuts and bonds onto the cylinder block, and the communication path is a groove formed in the bonding surface.

5. An internal combustion engine in which a plurality of cylinders are arranged in series in a cylinder section, the internal combustion engine comprising: a communication path through which combustion chambers of the cylinders adjacent to each other communicate with each other, wherein a pressure sensor is disposed in the communication path, a wall portion that partitions the adjacent combustion chambers is disposed between the adjacent combustion chambers, the pressure sensor is inserted in the wall portion, check valves are arranged in the communication path, the check valves comprise a one-side check valve disposed on a side of one of the cylinders, and an other-side check valve disposed on a side of the other of the cylinders, and the one-side check valve allows flow of a pressure from the one of the cylinders to the other of the cylinders, and the other-side check valve allows flow of a pressure from the other of the cylinders to the one of the cylinders.

6. An internal combustion engine in which a plurality of cylinders are arranged in series in a cylinder section, the internal combustion engine comprising:

a communication path through which combustion chambers of the cylinders adjacent to each other communicate with each other, wherein a pressure sensor is disposed in the communication path, the cylinder section comprises a cylinder block, and a cylinder head comprising the combustion chambers, the cylinder head comprises a bonding surface that abuts and bonds onto the cylinder block, and the communication path is a groove formed in the bonding surface.

7. The internal combustion engine according to claim 2, wherein the cylinder section comprises a cylinder block, and a cylinder head comprising the combustion chambers, the cylinder head comprises a bonding surface that abuts and bonds onto the cylinder block, and the communication path is a groove formed in the bonding surface.

8. The internal combustion engine according to claim 3, wherein the cylinder section comprises a cylinder block, and a cylinder head comprising the combustion chambers, the cylinder head comprises a bonding surface that abuts and bonds onto the cylinder block, and the communication path is a groove formed in the bonding surface.

\* \* \* \* \*